(12) United States Patent
Kamrowski

(10) Patent No.: US 6,917,615 B2
(45) Date of Patent: Jul. 12, 2005

(54) METHOD OF AND DEVICE FOR SENDING INFORMATION TO MULTIPLE ADDRESSES

(75) Inventor: Brian Kamrowski, Cheektowaga, NY (US)

(73) Assignee: Intel Corporation, Santa Clara, CA (US)

(*) Notice: Subject to any disclaimer, the term of this patent is extended or adjusted under 35 U.S.C. 154(b) by 840 days.

(21) Appl. No.: 09/835,806

(22) Filed: Apr. 16, 2001

(65) Prior Publication Data
US 2002/0150101 A1 Oct. 17, 2002

(51) Int. Cl.⁷ .............................................. H04L 12/56
(52) U.S. Cl. ..................... 370/393; 370/392; 370/389
(58) Field of Search ............................. 370/389, 390, 370/392, 393, 395.1, 396, 395.31, 395.4, 400, 432, 468, 477

(56) References Cited

U.S. PATENT DOCUMENTS

| 6,721,334 B1 | * | 4/2004 | Ketcham ............... 370/473 |
| 6,735,190 B1 | * | 5/2004 | Chuah et al. ............ 370/352 |
| 2002/0085498 A1 | * | 7/2002 | Nakamichi et al. ..... 370/236 |

OTHER PUBLICATIONS

Cisco Systems, Inc., "Multicast Routing", INet XP002203650, Retrieved from Internet http://www.cisco.com/warp/public/614/17.ht, posted Mar. 19, 1999, 9:48:52 PST.

* cited by examiner

Primary Examiner—Wellington Chin
Assistant Examiner—Mark A Mais
(74) Attorney, Agent, or Firm—Blakely, Sokoloff, Taylor & Zafman LLP

(57) ABSTRACT

A method and device send information via a network of computers.

20 Claims, 12 Drawing Sheets

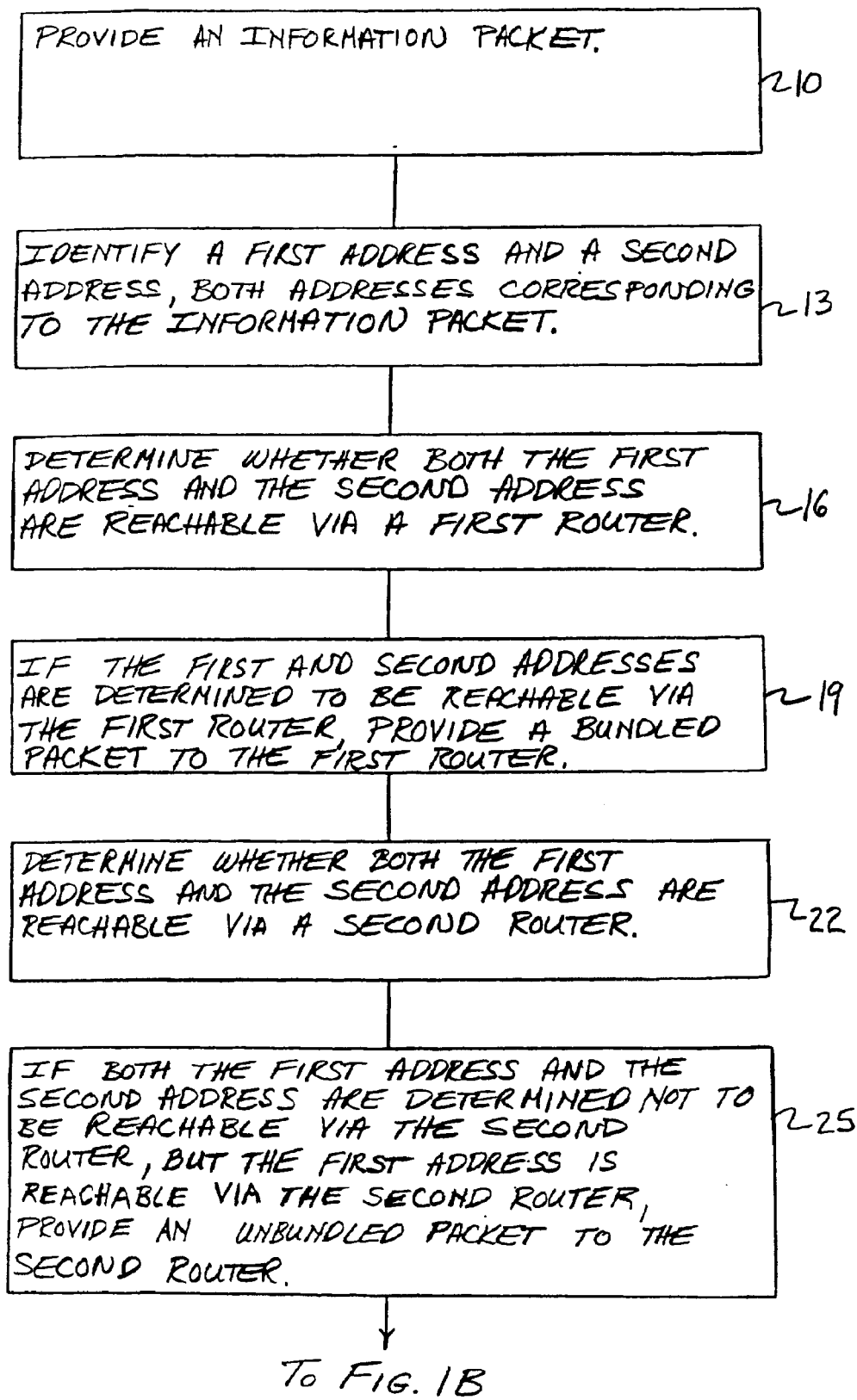

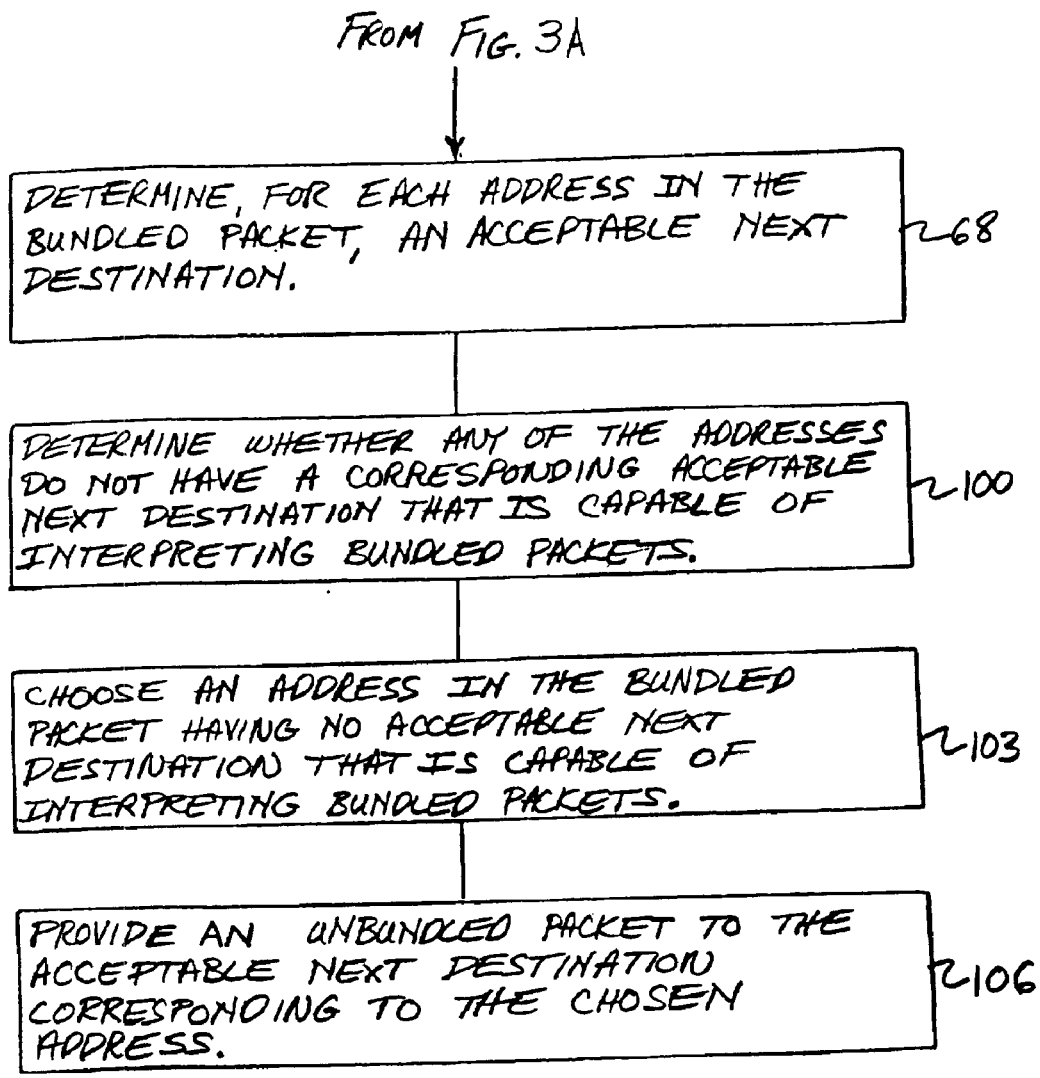

METHOD OF AND DEVICE FOR SENDING INFORMATION TO MULTIPLE ADDRESSES

BACKGROUND INFORMATION

This invention relates generally to bundling data for transmission over a network, such as the Internet. The Internet includes a plurality of interconnected computers, each computer having an address and one or more communication lines. Many Internet server applications produce a high volume of traffic. Often a piece of information, such as an image corresponding to a web page to be displayed on a user's computer, is sent to many users during a short time span. Sending the same piece of information to many users during a short time span occupies a large amount of the available bandwidth used to send information via the Internet. When the bandwidth is in short supply, delays and dropped information result. Accordingly, there is a need to reduce the amount of bandwidth occupied by sending a piece of information to many users during a short time span.

BRIEF DESCRIPTION OF THE DRAWINGS

An embodiment of the invention is understood by referencing the following detailed description taken in conjunction with the accompanying drawings, in which:

FIGS. 1A and 1B is a block flow diagram in accordance with an embodiment of the invention;

FIGS. 3A and 3B is a block flow diagram in accordance with another embodiment of the invention;

DETAILED DESCRIPTION OF THE INVENTION

Briefly, according to an embodiment of the invention, a reduction in the amount of bandwidth occupied by sending a piece of information to many users is achieved by bundling one such piece of information with more than one address into a single packet. Such a bundled packet is then sent via a network, and then unbundled at some point prior to reaching the users. The foregoing may be accomplished, briefly, by a method of sending information via a network of computers wherein an information packet is received, a plurality of addresses corresponding to the information packet are identified, and an acceptable next destination for each address of the plurality of addresses is determined. Then addresses having a network device as the acceptable next destination are selected, and a bundled packet is provided to the network device, the bundled packet including the selected addresses and the information packet.

A packet bundling device according to an embodiment of the invention may include, briefly, a routing table memory device which receives a plurality of addresses in a bundled packet, an analysis circuit which determines whether any of those addresses have a common next destination indicated by the routing table and capable of interpreting bundled packets, and a bundled packet construction circuit which builds a bundled packet if the analysis circuit determines that the addresses and the common next destination satisfy certain conditions.

Figure 1B:
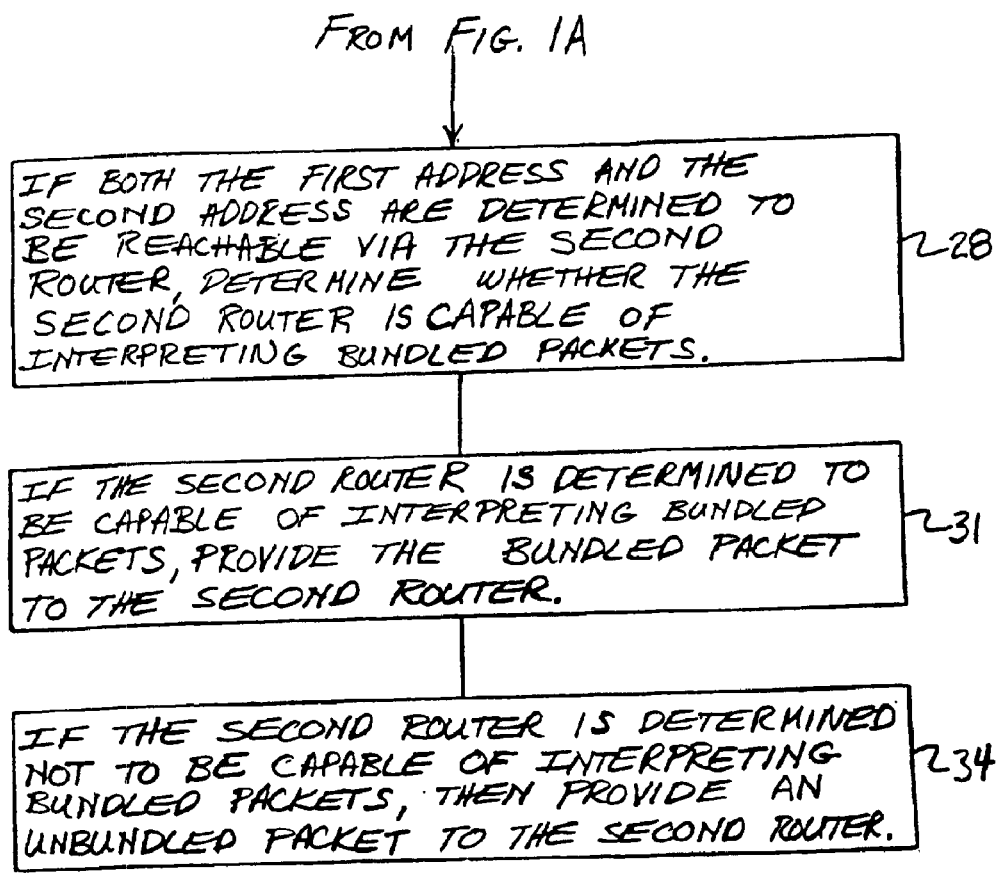

FIGS. 1A and 1B illustrate a method of sending information via a communications network, according to an embodiment of the invention. One type of communications network to which the method may be applied is a system of computers connected by communications lines. In such a method an information packet is provided 10, and a first address and a second address are identified 13. Both the first address and second address correspond to the information packet. A determination is made 16 as to whether both the first address and the second address can receive an information packet sent via a first network device, such as a router, switch or gateway. If an information packet can be sent to an address via a network device, the address is referred to herein as being "reachable" via the network device. If both the first address and the second address are determined to be reachable via the first network device, a bundled packet is provided 19 to the first network device. The bundled packet includes the first address, the second address and the information packet.

An embodiment of a method according to the invention may further include determining 22 whether both the first address and the second address are reachable via a second network device, such as a router, switch or gateway. If both the first address and the second address are determined to be reachable via the second network device, the bundled packet is provided to the second network device. However, if both the first address and the second address are determined not to be reachable via the second network device, then a determination is made as to whether the first address is reachable via the second network device, and if so, an unbundled packet is provided 25 to the second network device. The unbundled packet includes the first address and the information packet.

The method may include making a determination 28 as to whether the second network device is capable of interpreting bundled packets. For example, if both the first address and the second address are determined 22 to be reachable via the second network device, the determination 28 as to whether the second network device is capable of interpreting bundled packets is made. The determination 28 as to whether the second network device is capable of interpreting bundled packets may be made by the first network device using a memory device that stores a list of network devices connected to the first network device and whether each of the network devices on the list is capable of interpreting bundled packets.

If the second network device is determined to be capable of interpreting bundled packets, the bundled packet is provided 31 to the second network device. However, if the second network device is determined not to be capable of interpreting bundled packets, an unbundled packet, including the first address and the information packet, is provided 34 to the second network device. Another unbundled packet, including the second address and the information packet, may also be provided to the second network device.

A method according to an embodiment of the invention may also include determining whether a second network device resides between a user at the first address and the first network device. If a second network device is determined not to reside between the user and the first network device, then the information packet is provided to the first address.

Figure 2A:
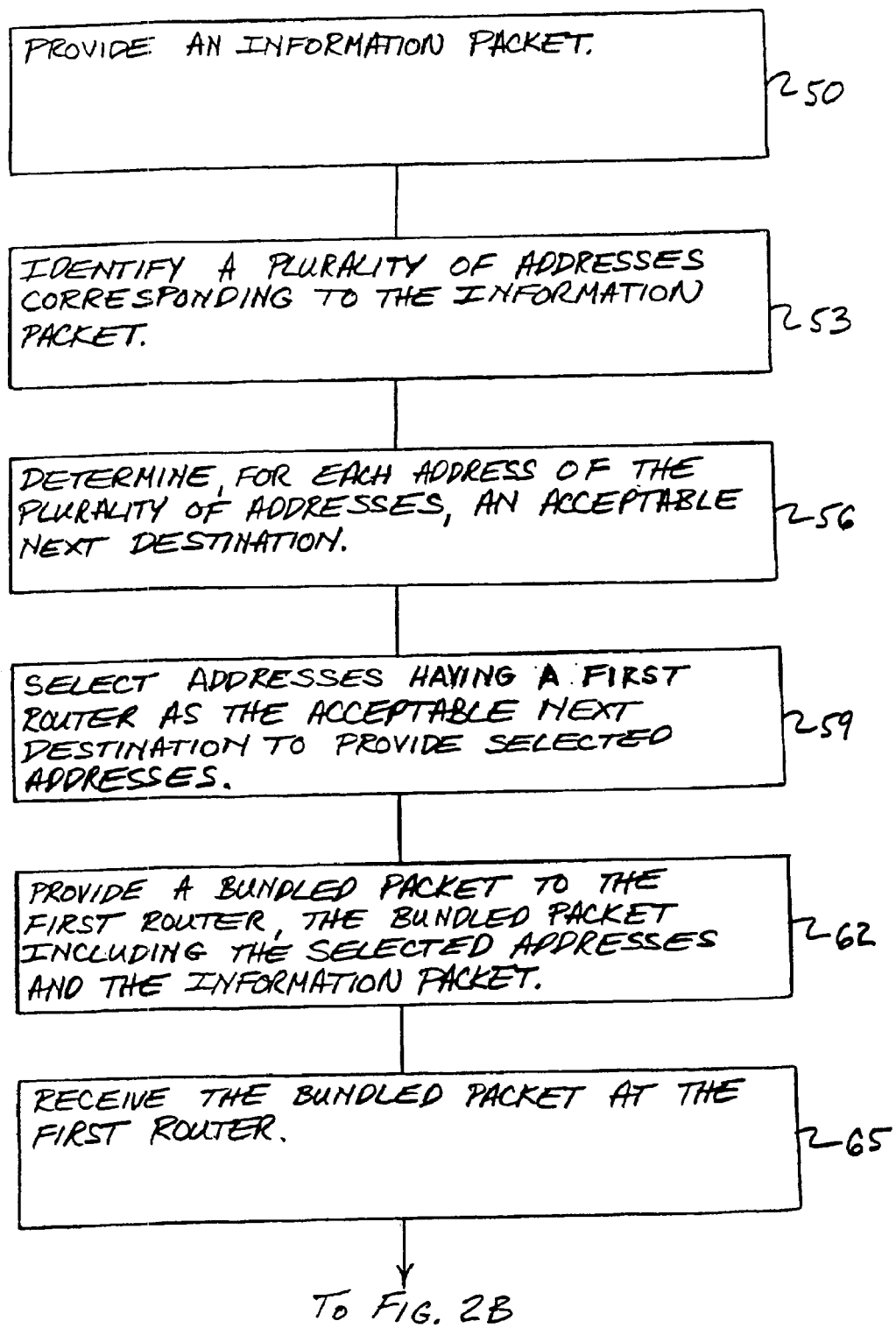
FIGS. 2A and 2B is a block flow diagram in accordance with another embodiment of the invention.
Figure 2B:
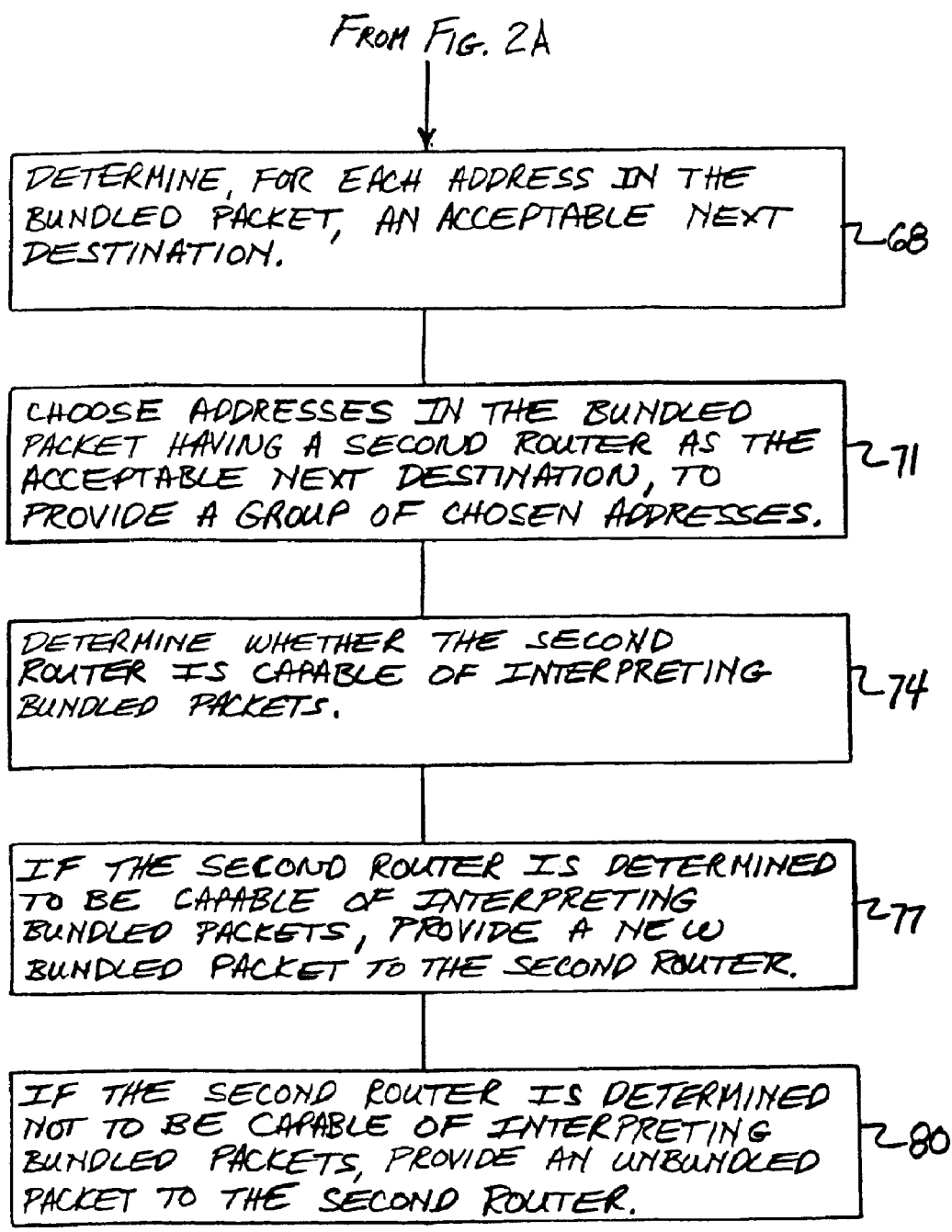

FIGS. 2A and 2B illustrate an embodiment of a method of sending information via a network of computers according to the invention. The method may include providing 50 an information packet and identifying 53 a plurality of addresses corresponding to the information packet. For each address of the plurality of addresses, an acceptable next destination is determined 56. For example, an acceptable next destination may be a network device that could receive the information packet as the information packet travels to the address. Addresses having a first network device as the acceptable next destination are selected 59 to provide selected addresses. Then a bundled packet is provided 62 to the first network device. The bundled packet includes the selected addresses and the information packet.

The method may continue by receiving 65 the bundled packet at the first network device, and determining 68, for each address in the bundled packet, an acceptable next destination. Addresses in the bundled packet having a second network device as the acceptable next destination are chosen 71 to provide a group of chosen addresses. A new bundled packet is then provided to the second network device. The new bundled packet includes the group of chosen addresses and the information packet.

Prior to providing the new bundled packet to the second network device, a determination 74 may be made as to whether the second network device is capable of interpreting bundled packets. If the second network device is determined to be capable of interpreting bundled packets, then the new bundled packet is provided 77 to the second network device. However, if the second network device is determined not to be capable of interpreting bundled packets, an unbundled packet is provided 80 to the second network device. The unbundled packet includes only one of the addresses in the group of chosen addresses and the information packet.

Figure 3A:
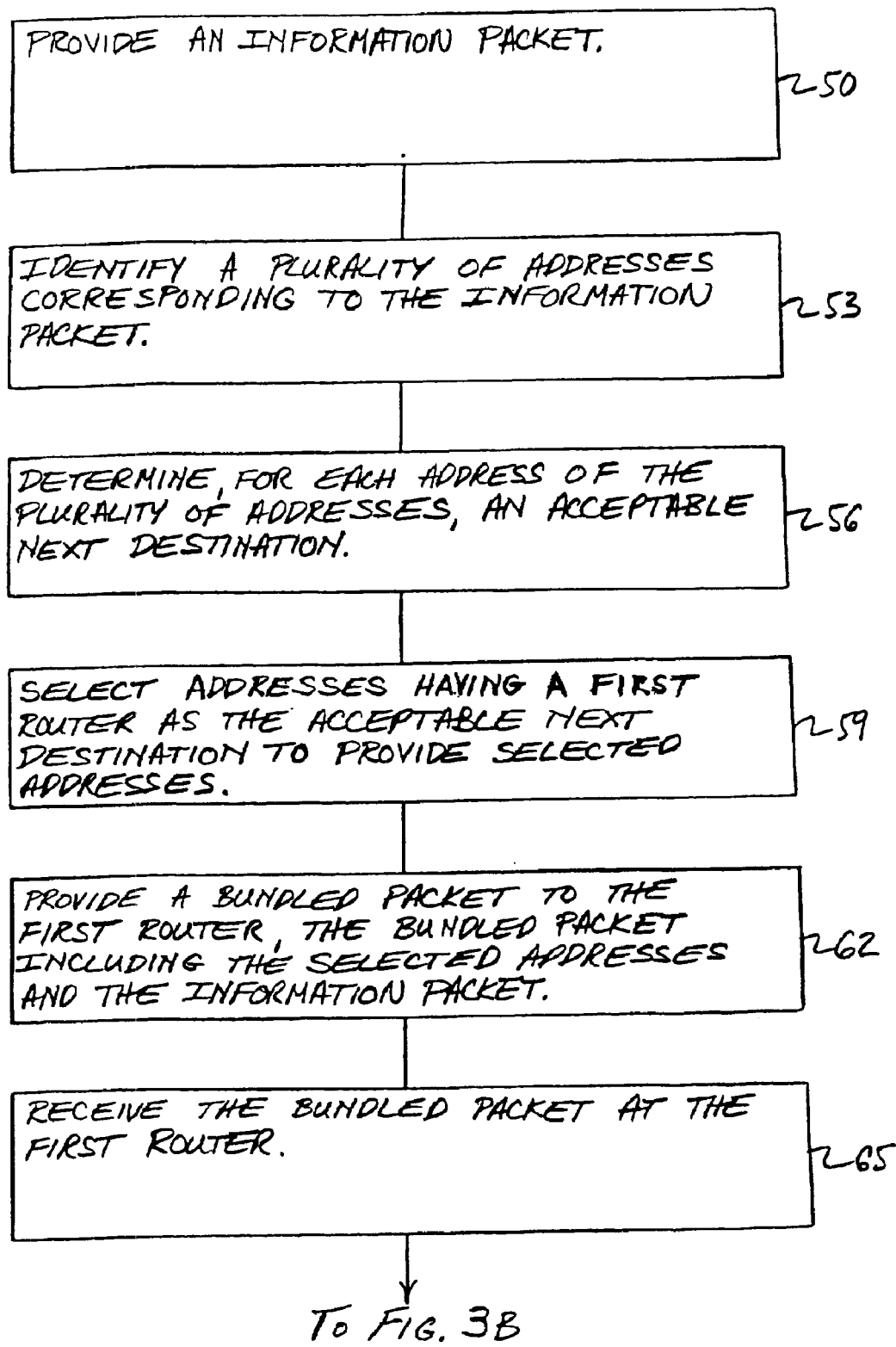

Another embodiment of a method according to the invention is illustrated in FIGS. 3A and 3B. Aspects of this method (and other methods described below) that are similar to aspects of the method illustrated in FIGS. 2A and 2B have the same feature number, and will not be discussed in detail below. The method illustrated in FIGS. 3A and 3B may include determining 68, for each address in the bundled packet, an acceptable next destination, and determining 100 whether any of the addresses do not have a corresponding acceptable next destination that is capable of interpreting bundled packets. An address that does not have a corresponding acceptable next destination that is capable of interpreting bundled packets is chosen 103, and an unbundled packet is provided 106 to the acceptable next destination corresponding to the chosen address. The unbundled packet includes the chosen address and the information packet.

Figure 4A:
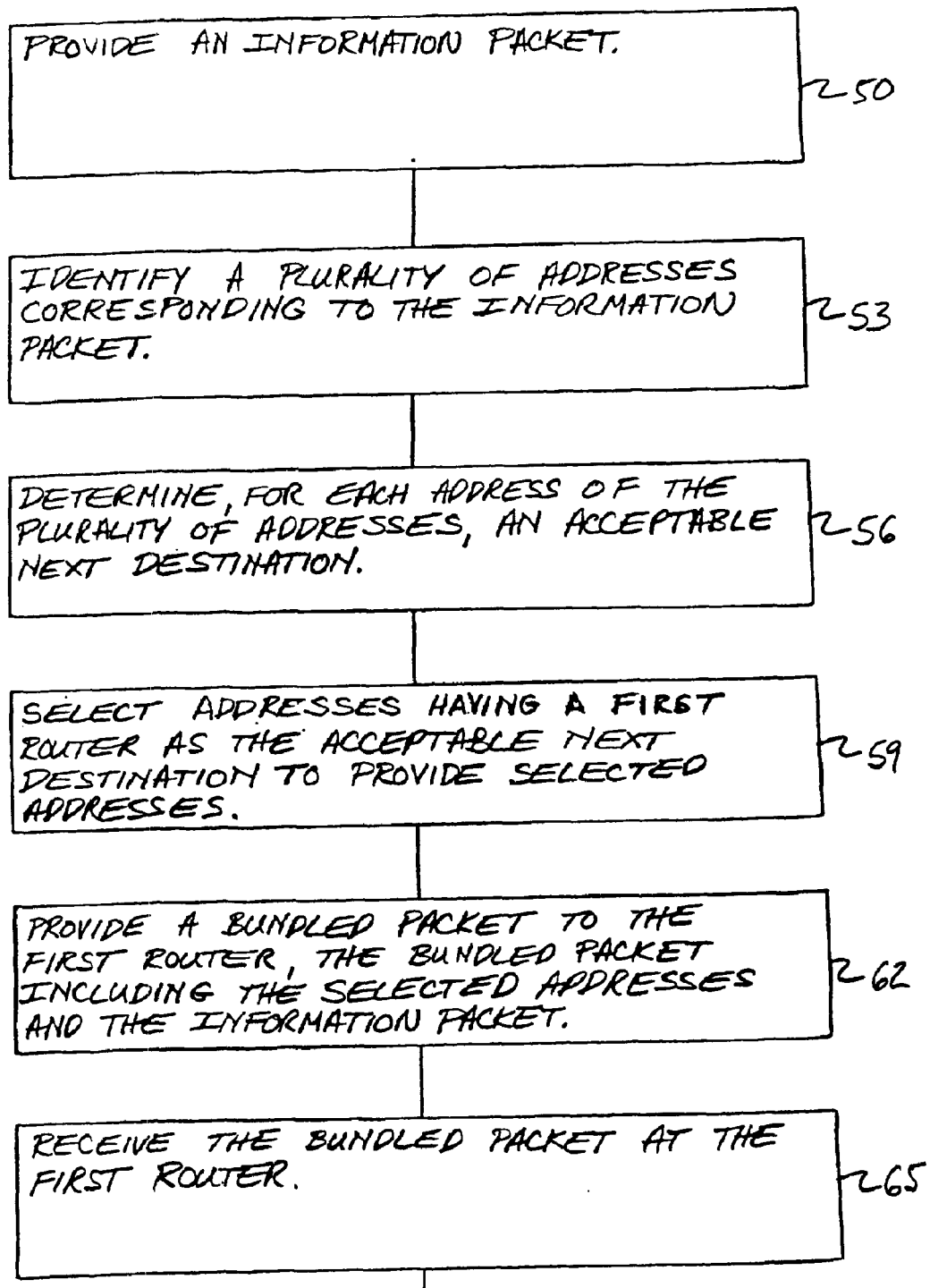
FIGS. 4A and 4B is a block flow diagram in accordance with another embodiment of the invention.
Figure 4B:
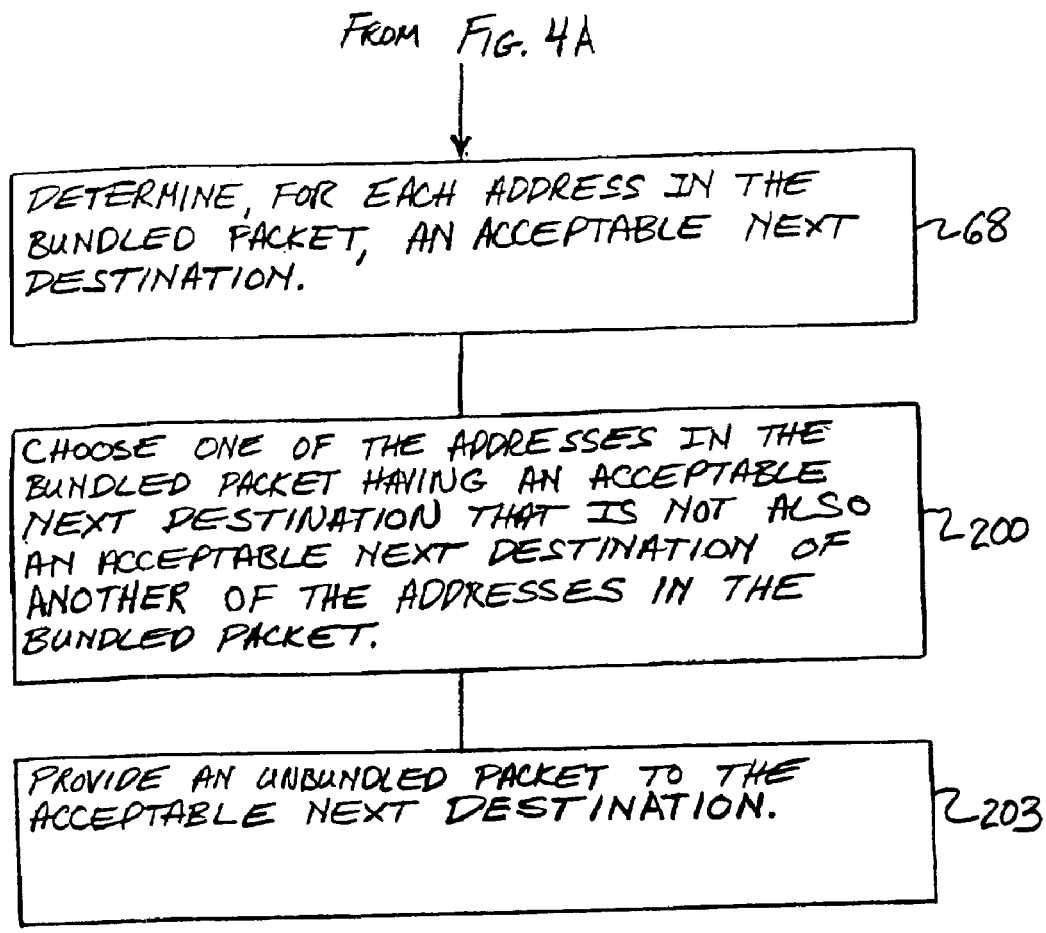

In some situations, an address in the plurality of addresses will not share an acceptable next destination with another address in the plurality of addresses. As shown in FIGS. 4A and 4B, in such situations the address in the bundled packet that does not have an acceptable next destination that is not also an acceptable next destination of another of the addresses in the bundled packet is chosen 200. Then an unbundled packet, including the chosen one of the addresses and the information packet, is provided 203 to the acceptable next destination.

Figure 5A:
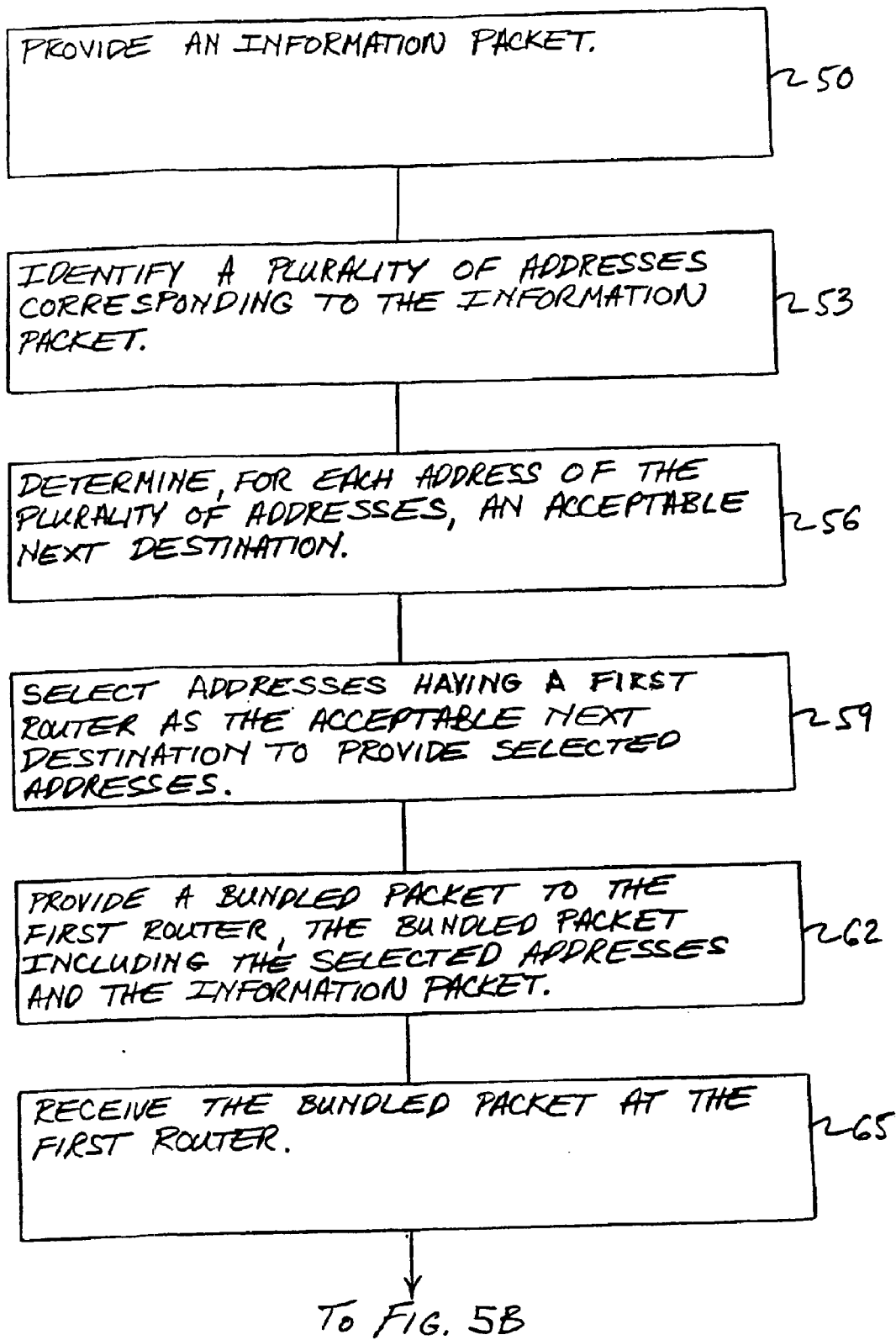
FIGS. 5A and 5B is a block flow diagram in accordance with another embodiment of the invention.
Figure 5B:
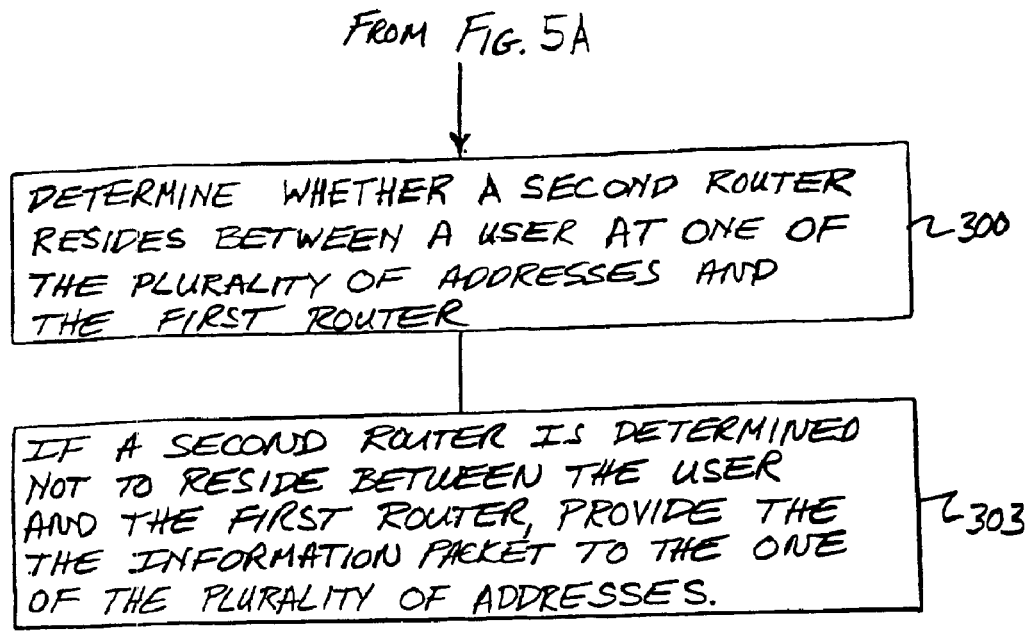

FIGS. 5A and 5B illustrate another embodiment of a method according to the invention in which a determination 300 may be made as to whether a second network device resides between a user at one of the plurality of addresses and the first network device. If a second network device is determined not to reside between the user and the first network device, then the information packet is provided 303 to that one of the plurality of addresses.

Figure 6:
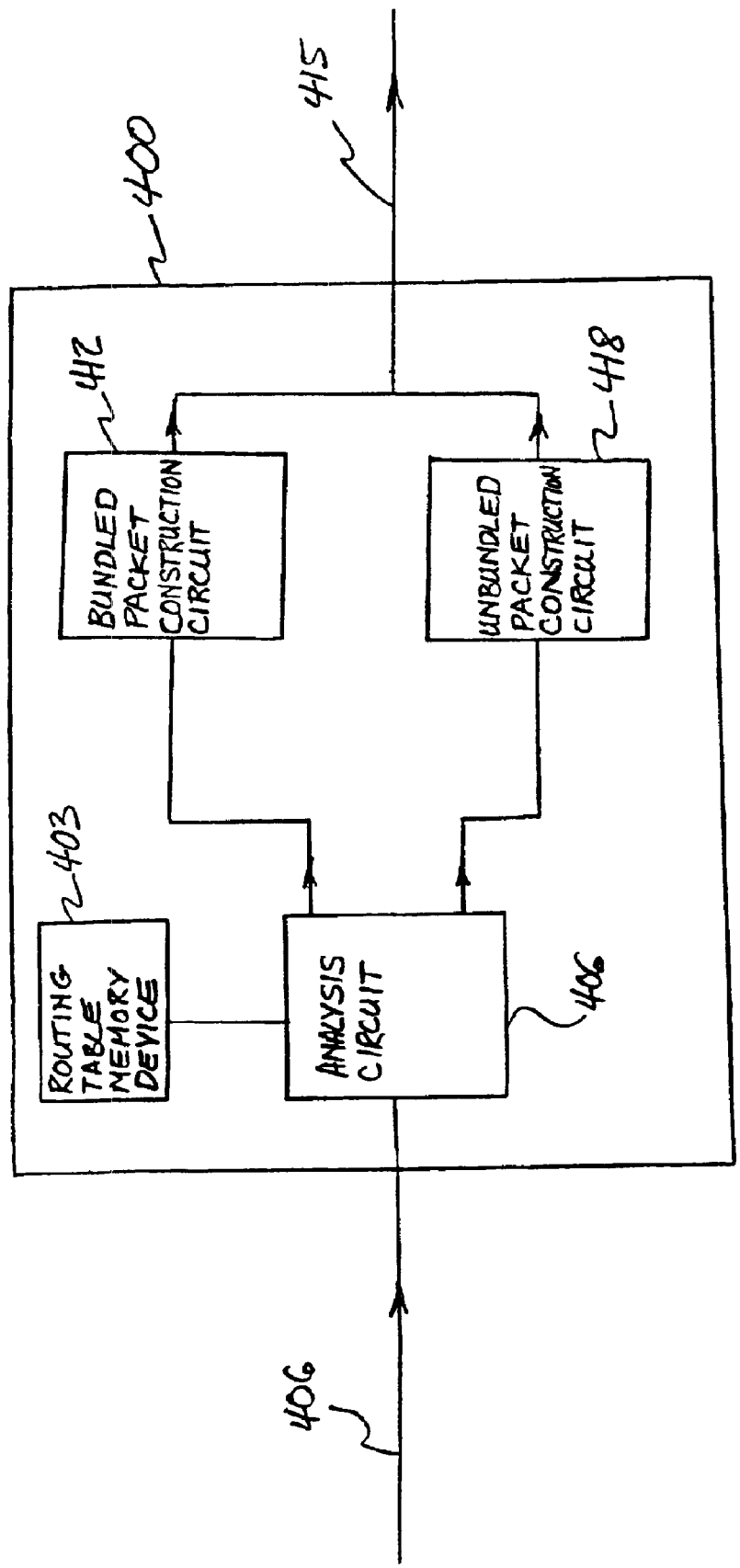
FIG. 6 is a schematic block flow diagram illustrating a device according to an embodiment of the invention.

FIG. 6 illustrates a packet building device 400 according to an embodiment of the invention. Such a packet building device 400 may have a routing table memory device 403. The routing table memory device 403 is capable of storing an address, a corresponding next destination and a corresponding indicator. The corresponding next destination for an address is along a route from a network device, having such a packet building device 400, to a user corresponding to the address. The indicator indicates whether the corresponding next destination is able to interpret bundled packets.

The packet building device 400 also may have an analysis circuit 406 that is capable of receiving and analyzing a bundled packet received by the packet building device 400 via a transmission line 409. A bundled packet, having an information packet and a plurality of addresses, received by the packet building device 400 is sometimes herein referred to as an "inbound bundled packet." The analysis circuit 406 is capable of determining whether any of a plurality of addresses bundled together in an inbound bundled packet have a common next destination indicated by the routing table. The analysis circuit 406 is also capable of determining whether the indicator corresponding to the common next destination indicates that the common next destination is able to interpret bundled packets.

The packet building device 400 also may include a bundled packet construction circuit 412. The bundled packet construction circuit 412 is capable of building a bundled packet if the analysis circuit 406 determines that (a) two or more of the addresses among the plurality of addresses have the common next destination, and (b) the common next destination is able to interpret bundled packets. A bundled packet built by the bundled packet construction circuit 412 is sometimes herein referred to as an "outbound bundled packet." The outbound bundled packet includes the information packet and the two or more addresses among the plurality of addresses that have the common next destination. An outbound bundled packet may be provided along a second transmission line 415.

The packet building device 400 may also have an unbundled packet construction circuit 418 capable of building an unbundled packet to be provided by the network device. An unbundled packet to be provided by the network device is sometimes referred to herein as an "outbound unbundled packet." The outbound unbundled packet includes the information packet, and may also include one address. The outbound unbundled packet is built if the analysis circuit 406 determines that an address among the plurality of addresses does not have a corresponding next destination that is also the next destination corresponding to another of the addresses among the plurality of addresses. The outbound unbundled packet is also built if the analysis circuit 406 determines that the next destination corresponding to an address among the plurality of addresses is not able to interpret bundled packets. An outbound unbundled packet may be provided along the second transmission line 415.

Figure 7:
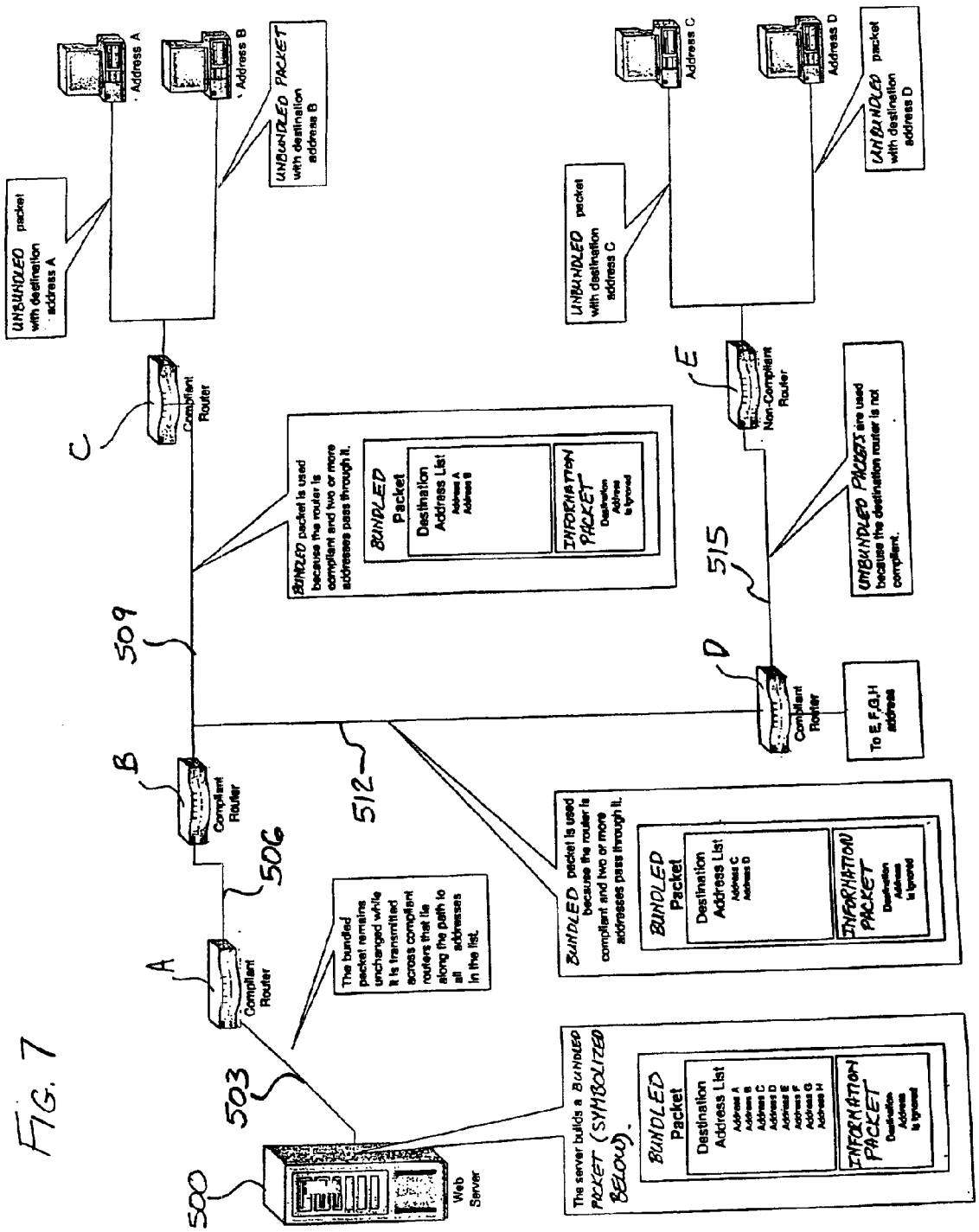
FIG. 7 is a schematic block flow diagram of a system utilizing devices and methods according to embodiments of the invention.

FIG. 7 shows a system utilizing devices and methods according to an embodiment of the invention. A general overview of methods and devices according to the invention will be described using FIG. 7. FIG. 7 includes a number of network devices labeled "Compliant Router," and these devices have a packet building device 400 according to an embodiment of the invention. FIG. 7 also includes a number of network devices labeled "Non-Compliant Router," and these devices do not have a packet building device 400 according to the invention. The system depicted in FIG. 7 shows the network devices as routers, and it is understood that a system according to this embodiment of the invention may include switches (compliant and non-compliant) and gateways (compliant and non-compliant).

The web server 500 illustrated in FIG. 7 may include a packet building device 400 that builds a bundled packet (using a bundled packet construction circuit 412) having an information packet and a list of addresses, Address A through Address H. The bundled packet may be provided by the web server 500 via a first transmission line 503 to compliant router A. Compliant router A determines that all of the addresses in the bundled packet, Address A through Address H, are reachable via compliant router B, and sends the bundled packet along a second transmission line 506 to router B. Router B determines that Address A and Address B are reachable via compliant router C, but Address C through Address H cannot be reached through router C. Router B then builds a first new bundled packet (using a bundled packet construction circuit 412) having the information packet and a list of addresses, Address A and Address B. The first new bundled packet is provided to compliant router C via a third transmission line 509. Router C recognizes that there are no more routers between router C and the users corresponding to Address A and Address B. Router C provides the information packet to users at Address A and Address B.

Router B also determines that Address C through Address H can be reached through compliant router D, and builds a second new bundled packet (using a bundled packet construction circuit 412) having the information packet and an address list with Address C through Address H. The second new bundled packet is provided to router D via a fourth transmission line. Router D determines that Address C and Address D are reachable via non-compliant router E, and also determines that router E is not capable of interpreting a bundled packet. Router D builds an unbundled packet (using an unbundled packet construction circuit 418) having the information packet and Address C and provides this unbundled packet to router E via a fifth transmission line 515. Router D also builds an unbundled packet (using an unbundled packet construction circuit 418) having the information packet and Address D, and provides this unbundled packet to router E via the fifth transmission line 515. Router E receives both of the unbundled packets, and provides the information packet to the users corresponding to Address C and Address D.

Although one or more embodiments of the invention have been described, it will be understood that other embodiments of the invention may be made without departing from the spirit and scope of the invention.

What is claimed is:

1. A method of sending information via a network of computers, comprising:

receiving an information packet for delivery to a plurality of users, each of the plurality of users having an address on the network of computers;

making a first selection of addresses from the addresses of the plurality of users that are reachable via a first network device; and providing a bundled packet to the first network device, the bundled packet including the first selection of addresses and the information packet.

2. The method of claim 1, further comprising:
receiving the bundled packet at the first network device;
making a second selection of addresses from the first selection of addresses that are reachable via a second network device; and
providing a new bundled packet to the second network device, the new bundled packet including the second selection of addresses and the information packet.

3. The method of claim 1, further comprising:
receiving the bundled packet at the first network device;
making a second selection of addresses from the first selection of addresses that are reachable via a second network device;
determining whether the second network device is capable of interpreting bundled packets; and
if the second network device is determined to be capable of interpreting bundled packets, providing a new bundled packet to the second network device, the new bundled packet including the second selection of addresses and the information packet.

4. The method of claim 3, further comprising, if the second network device is determined not to be capable of interpreting bundled packets, providing an unbundled packet to the second network device for each address in the second selection of addresses each of the unbundled packets including only one address from the second selection of addresses and the information packet.

5. The method of claim 1, further comprising:
receiving the bundled packet at the first network device;
determining, for each address in the bundled packet, an acceptable next destination;
determining whether any of the addresses do not have a corresponding acceptable next destination that is capable of interpreting bundled packets;
choosing an address in the bundled packet having no acceptable next destination that is capable of interpreting bundled packets; and
providing an unbundled packet to the acceptable next destination corresponding to the chosen address, the unbundled packet including the chosen address and the information packet.

6. The method of claim 1, further comprising:
receiving the bundled packet at the first network device;
determining, for each address in the bundled packet, an acceptable next destination;
choosing one of the addresses in the bundled packet having an acceptable next destination that is not also an acceptable next destination of another of the addresses in the bundled packet; and
providing an unbundled packet to the acceptable next destination, the unbundled packet including the chosen one of the addresses and the information packet.

7. The method of claim 1, further comprising:
receiving the bundled packet at the first network device;
determining whether a second network device resides between a user at one of the plurality of addresses and the first network device; and
if a second network device is determined not to reside between the user and the first network device, then providing the information packet to the one of the plurality of addresses.

8. A method of sanding information over a communications network, comprising:
receiving an information packet for delivery to a first and a second user having a first and a second address respectively;

determining whether both the first address and the second address are reachable via a first network device; and if both the first address and the second address are determined to be reachable via the first network device, providing a bundled packet to the first network device, the bundled packet including the first address, the second address and the information packet determining whether both the first address and the second address are reachable via a second network device;

determining whether the second network device is capable of interpreting bundled packets; and if the first address and the second address are determined to be reachable via the second network device, and the second network device is determined to be capable of interpreting bundled packets, providing the bundled packet to the second network device.

9. The method of claim 8, further comprising:

if both the first address and the second address are determined not to be reachable via the second network device, then determining whether the first address is reachable via the second network device; and if the first address is determined to be reachable via the second network device, providing an unbundled packet to the second network device, the unbundled packet including the first address and the information packet.

10. The method of claim 8, further comprising, if the second network device is determined not to be capable of interpreting bundled packets, then providing a first unbundled packet to the second network device, the first unbundled packet including the first address and the information packet.

11. The method of claim 10, further comprising:

providing a second unbundled packet to the second network device, the second unbundled packet including the second address and the information packet.

12. The method of claim 8, further comprising:

determining whether a second network device resides between a user at the first address and the first network device; and if a second network device is determined not to reside between the user and the first network device, then providing the information packet to the first address.

13. A packet building device, comprising:

a routing table memory device, the routing table memory device being capable of storing an address, a corresponding next destination and a corresponding indicator, the next destination being along a route from the packet building device to a user corresponding to the address, and the indicator indicating whether the corresponding next destination is able to interpret a bundled packet, the bundled packet including an information packet and at least two addresses, there being at least two users with each of the at least two users corresponding to one of the at least two addresses;

an analysis circuit capable of determining whether any of a plurality of addresses bundled together in a bundled packet received by the packet building device have a common next destination indicated by the routing table, and capable of determining whether the indicator corresponding to the common next destination indicates that the common next destination is able to interpret bundled packets; and a bundled packet construction circuit, capable of building a bundled packet to be provided by the packet building device if the analysis circuit determines that (a) two or more of the addresses among the plurality of addresses have the common next destination, and (b) the common next destination is able to interpret bundled packets, the bundled packet to be provided by the packet building device including the information packet and the two or more of the addresses that have the common next destination.

14. The packet building device of claim 13, further comprising an unbundled packet construction circuit capable of building an unbundled packet to be provided by the packet building device if the analysis circuit determines that an address among the plurality of addresses does not have a next destination that is the same next destination corresponding to another of the addresses among the plurality of addresses, the unbundled packet to be provided by the packet building device including the information packet.

15. The packet building device of claim 14, wherein the unbundled packet to be provided by the packet building device further includes only one of the at least two addresses.

16. The packet building device of claim 13, further comprising an unbundled packet construction circuit capable of building an unbundled packet to be provided by the packet building device if the analysis circuit determines that an address among the plurality of addresses does not have a corresponding next destination that is able to interpret bundled packets, the unbundled packet to he provided by the packet building device including the information packet, the unbundled packet construction circuit building unbundled packets for each of the at least two addresses in the bundled packet.

17. The packet building device of claim 16, wherein the unbundled packet to be provided by the packet building device further includes only one of the at least two addresses.

18. A system, comprising:

a server capable of (a) receiving an information packet, (b) identifying a plurality of addresses corresponding to the information packet, determining an acceptable first destination for each address of the plurality of addresses, and (d) selecting addresses having a first network device as the acceptable first destination:

a first network device in communication with the server and capable of (a) receiving the information packet, (b) determining an acceptable second destination for each address associated with the information packet received by the first network device, and (c) sending the information packet to the second destinations.

19. The system of claim 18, wherein the first network device is capable of determining whether one of the second destinations is capable of interpreting the information packet if the information packet is provided to the one of the second destinations in a form that associates the information packet with a plurality of addresses.

20. The system of claim 18, wherein the first network device is in communication with a user.

* * * * *